O. G. SIMMONS.
HOB FOR CUTTING INVOLUTE GEARS.
APPLICATION FILED NOV. 6, 1916.

1,241,291.

Patented Sept. 25, 1917.
3 SHEETS—SHEET 2.

Inventor:
O. G. Simmons,
By Bruce S. Elliott
Atty.

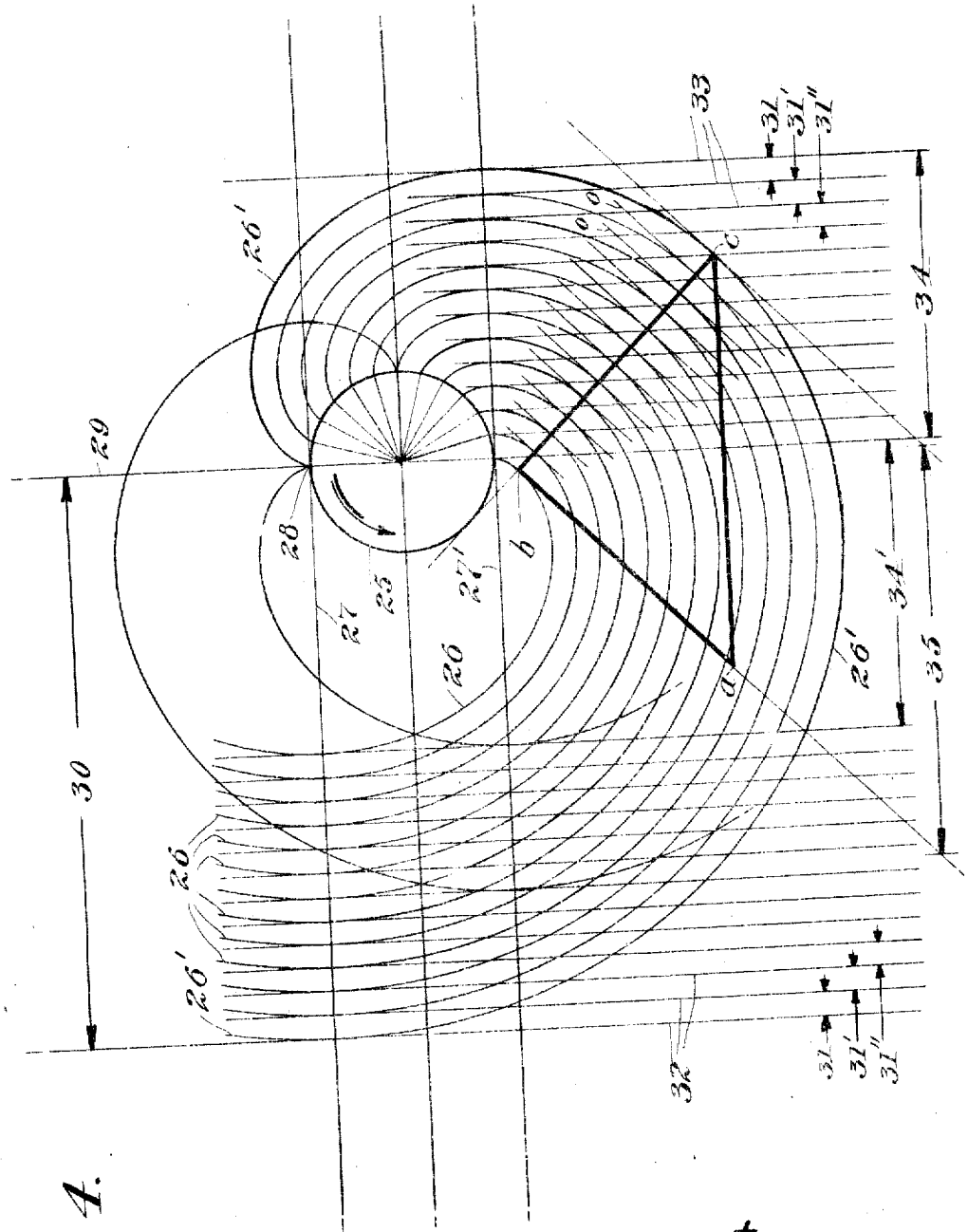

UNITED STATES PATENT OFFICE.

OLIVER G. SIMMONS, OF ROCHESTER, NEW YORK.

HOB FOR CUTTING INVOLUTE GEARS.

1,241,291.  Specification of Letters Patent.  Patented Sept. 25, 1917.

Application filed November 6, 1916. Serial No. 129,670.

*To all whom it may concern:*

Be it known that I, OLIVER G. SIMMONS, a citizen of the United States, residing in Rochester, in the county of Monroe and State of New York, have invented new and useful Improvements in Hobs for Cutting Involute Gears, of which the following is a specification.

This invention relates to a hobbing cutter adapted to be rotated in a suitable machine to cut involute gears. The invention has for its general object to produce a hobbing cutter which will admit of the gears cut thereby being interchangeable with other gears of the same diametral pitch and system, whether such other gears have been cut in a milling machine, hobbing machine, or in a gear planer, thereby avoiding any necessity for an empirical modification of the tooth curve.

Stated in detail objects of the invention are to produce a hob having a novel construction of teeth arranged in the form of a helix, which will, in operation, result in the generation of true involute curves on the teeth of spur gears, said curves extending from the imaginary base circle to the periphery of the gear; to produce a helical hob having a lead, measured on the angle of the helix, which will equal the base circle pitch of the gear being cut; to provide the teeth of the hobbing cutter with a circular cutting point in the form of a curve of a circle, preferably a semi-circle, for producing a curved clearance space at the roots of adjacent teeth; and to provide a hob the cutting points of the teeth whereof are confined within parallel lines perpendicular to the axis of the helix.

Prior to my invention all hobbing cutters, of which I have knowledge, have been constructed upon the principle of the rack, the teeth of which are inclined at an angle to the line of travel of the rack equal to the pressure angle of the gear which is to mate with the rack. It will later be demonstrated herein, however, that the theoretically correct-shaped rack tooth presents only one point of contact for the teeth of the mating gear when the lineal movement of said rack tooth is directly proportioned to the movement of the involute curve. In practice, owing to the wearing of such teeth, their use would not be feasible. It is important to know this, however, for the reason that it is the general practice to make the form adopted for the rack tooth the key to any system of gearing; and this for the reason that if all gears of the system will mesh with the rack it necessarily follows that they will mesh with one another. It will be shown, however, that the inclination of the sides of the rack tooth is scientifically incorrect when it is desired to have the lineal movement of such rack tooth directly proportioned to the movement of the involute curve in contact, and that therefore there can be no true rolling movement directly proportioned to the involute curves of the base circle between a spur gear having involute teeth and such a rack. It therefore holds that if a rack having the sides of the teeth inclined will not produce a true rolling movement directly proportioned to the lead of the mating involute curves when in mesh with an involute gear, a hobbing cutter, the sides of whose teeth are inclined, will not cut gears having teeth with true involute curves of the base circle if the lineal movement of the counter part rack is directly proportioned to the lead of said involute curves.

The present invention, therefore, is based on the principle that the teeth of the hob, with a normal lead equal to the base circle pitch, to cut gear teeth having true involute-curved sides, must have parallel sides or cutting edges; or, more accurately stated, the cutting points of the teeth must lie in parallel lines perpendicular to the axis of the hob. I will now proceed to describe my invention and to demonstrate the accuracy of the principle involved, having reference to the accompanying drawings, in which—

Figure 1 is a sectional view showing my improved hob in connection with a 12-tooth gear of 2-diametral pitch, and showing the cutting of the gear as having been completed by the hob. In this view, the teeth of the hob are sectioned on the lines 3—3, 4—4, 5—5, etc., of Fig. 3 and have all of their faces brought to the same longitudinal plane, for the purpose of enabling the measurements of the teeth to be clearly shown with reference to the gear being cut; and the body of the hob below the teeth is shown as a true longitudinal section.

Fig. 4 is a diagrammatic view illustrating the extent to which a rack having teeth with inclined sides will be advanced beyond the true mating distance by contact with a tooth having a true involute curve.

Figure 1:
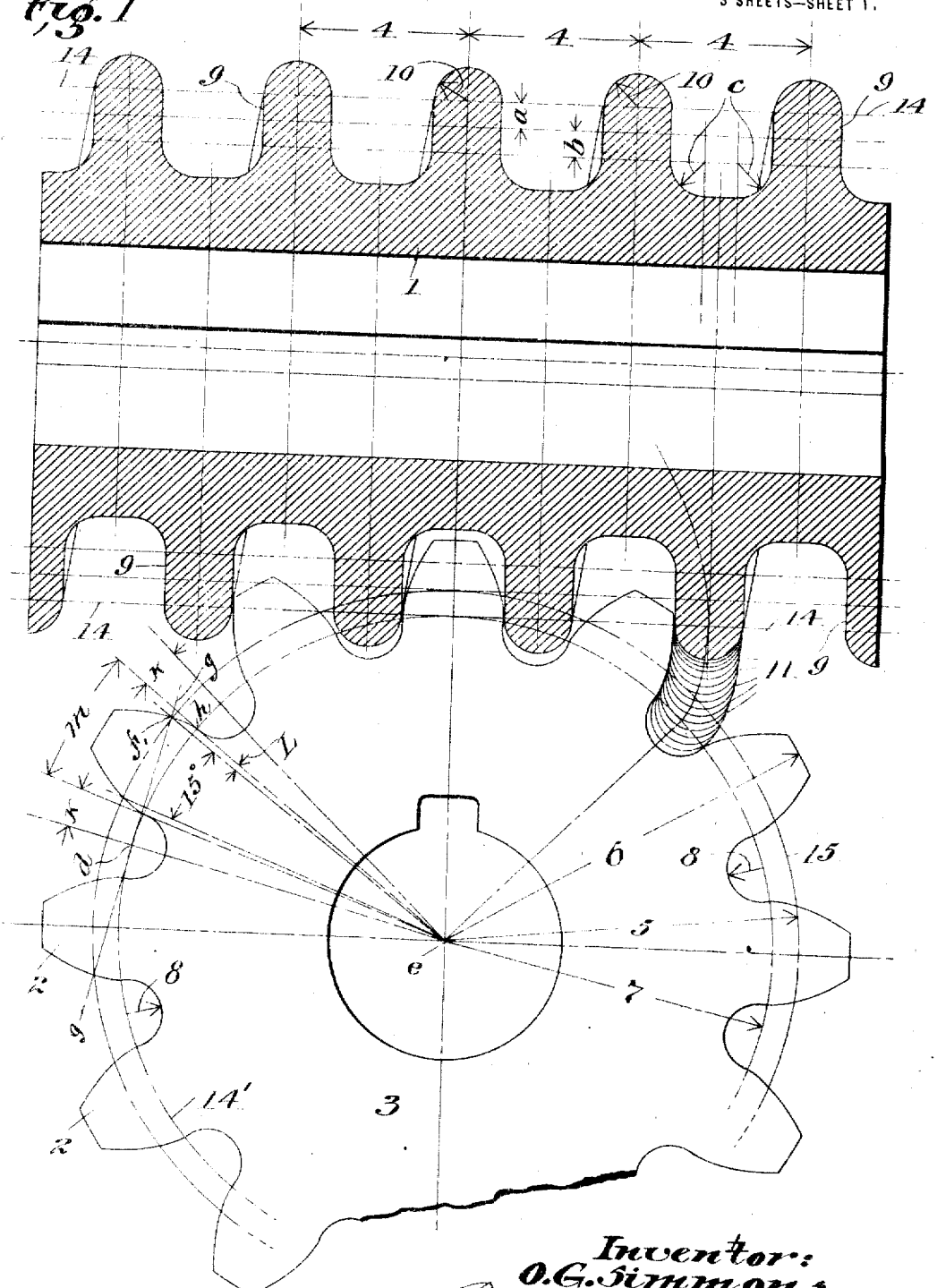

Referring now to Fig. 1, the numeral 1 indicates the hobbing cutter as it would appear when generating the teeth 2 of the gear, indicated by the numeral 3. The section shown of the hobbing cutter 1 is taken on a line perpendicular to the angle of the helix of the right-hand threaded hob, as indicated by the section lines in Figs. 2 and 3 on which Fig. 1 is taken. The numeral 4 indicates the lead or pitch of the hob 1, measured on the angle of the helix, said lead being equal to the base circle pitch of the gear 3. The base circle pitch is the distance between the teeth 2 of the gear 3 measured on the base circle.

The numeral 9 indicates the teeth of the hob, and for reasons which will hereinafter be demonstrated, these teeth have their cutting points confined within parallel lines which are perpendicular to the axis of the hob and, as above shown, have a normal pitch equal to the base circle pitch of the gear being cut. As will later be shown, the teeth 9 do not have to be straight-sided, for the reason that in operation a single point only generates the involute curve, but the straight sides are a convenient form of construction. In the gear 3 the adjacent involute curves of the teeth are joined by a curved line from the points of origin of the curves on the base circle 14', said curve having a radius indicated by the numeral 8. In order to generate this curve the teeth 9 of the hob 1 are provided with curved outer ends, each of said curves having a radius 10 equal to the radius 8. These curves join the straight sides of the teeth 9 at the point of intersection of the base line 14 therewith, said base line 14 corresponding in the hob with the root circle 14' of the gear. As will more clearly hereinafter appear, the effective parts of the teeth 9, so far as generating true involute curves in the cutting of the teeth of the gear is concerned, are the points of intersection of the curved lines of the teeth with the base line 14. Below these points the teeth of the hob may therefore have any desired form of clearance. In order to demonstrate the correctness of the position that only a single cutting point on either side of each tooth of the hob generates the involute curve of the teeth cut, I submit the following demonstration, based upon the illustration of Fig. 4; first premising that an involute curve has an unvarying and definite lead when measured on a line tangent to the evolute, or the generating circle. This truth may be stated in the form of a law, as follows:

The involute of any evolute has a constant lead when measured on a line tangent to said evolute, and is equal to the perimeter of the generating evolute.

Referring now to said Fig. 4, the numeral 26 indicates involute curves generated according to the above law and having as an evolute the circular disk indicated by the numeral 25. The involute curves 26 have been generated equidistant over one-half of the periphery of the disk 25. The numeral 27 indicates a line tangent to the disk 25 at the point 28. Passing through the point 28 and the center of the disk 25 is the line 29. The line 29, therefore, is perpendicular to the line 27. The line 27' is tangent to the disk 25 and parallel to the line 27. The point of tangency 28 of the line 27 is the point of origin of the involute curve 26', so that the numeral 30 indicates the lead of the involute curves 26' and 26, because all involutes generated from the same evolute are equal, and the measure is taken on a line parallel to the tangent line 27, the involute curve 26' being shown as extending through one complete revolution or spire.

Since all involute curves generated from the same circle, but from different points of origin, are parallel, and since the involute curves 26 and 26' are equi-distant on the periphery of the circle of the disk 25, it follows that the measures 31, 31' and 31" between the parallel lines 32 are equal. The lines 32 are parallel and tangent to the involutes 26 and 26'; they must, therefore, be perpendicular to some tangent line to the circle of the disk 25, because all tangents to an involute are also perpendicular to the tangent to the evolute; and the point of tangency of the tangent to the involute is also the point of intersection of the two tangents. From this it is seen that the tangent lines 32 are perpendicular to the tangent line 27. In like manner it can be shown that the lines 33 are tangent to the involute curves 26 and 26', and perpendicular to the tangent line 27', and that they are equi-distant. It follows, further, that the sum of the measure between the lines 32 or 33, as represented by the numerals 31, 31' and 31", will be equal to one-half of the lead of the involute curve 26', as measured on the tangent line 27, such measure being indicated by the numeral 34. The measure indicated by the numeral 34' will then represent the other half of such lead, and the sum of these measures will equal the lead 30 of the involute curve 26'. It is understood, of course, that the path of travel of a rack will necessarily be parallel to the tangent lines 27 and 27'; and, as I affirm, the flanks of the teeth of the rack should be perpendicular to the tangent lines 27 and 27' in order to have uniform linear motion according to the lead of the involute curves of the teeth of the mating gear.

To prove the above truth let the line a—b, Fig. 4, drawn at an angle of 45° to the tangent line 27', represent one side of a rack tooth, and the involute curve 26 represent one side of a tooth of a gear in engagement with said rack tooth; it will now be shown that the lineal movement of this tooth a—b will exceed the lead of the mating involute 26, which is the true movement, by over forty-one per cent. The line b—c is drawn tangent to the disk circle 25 and at an angle of 45° with respect to the tangent line 27'. The line a—b is also tangent to the involute curve 26, as shown; the lines a—b and b—c will therefore form a right angle, or an angle of 90°; and if from the point of intersection c of the line b—c with the involute curve 26' the line c—a be drawn parallel to the tangent line 27', the triangle a—b—c will be formed having the sides a—b and b—c equal. This triangle will then represent the tooth of the rack, and if the disk 25 is turned in the direction of the arrow the involute curve 26, beginning at the point of tangency b, will slidingly engage over the whole of the length of the line b—a, moving the triangle a—b—c along the base a—c, parallel to the tangent line 27' until the end a of the line a—b coincides with c, when the involute curve 26 will have assumed the position of the involute curve 26' and the circular disk 25 will have made one-half a revolution. The engagement between the curve 26 and the line a—b is shown successively by the short lines o perpendicular to b—c and tangent to the involute curves 26 and 26'. As the end a of the line a—b will coincide with the end c of the line b—c at the termination of the above movement, the triangle a—b—c will have moved to the right through a distance equal to the line a—c, which distance is indicated by the numeral 35. It is seen by inspection that the distance indicated by the numeral 35 is greater than that indicated by the numeral 34, which, as has been previously stated, is the true distance. It will now be seen that when the flank of a rack tooth is inclined at an angle to the perpendicular to the tangent line (the line of travel of the rack) there will result this gradual forging ahead of the rack, as above diagrammatically illustrated; and this fact together with the use of a long addendum and dedendum and small pressure angle, has made it necessary therefore to modify and correct the teeth of the rack at the outer portion of the faces and flanks in order to permit a gear to mesh at all with the rack. This distance traveled by the tooth of the rack in excess of the true distance it should have traveled can be readily shown from the following:

The diameter of the circular disk 25 is equal to 1.5119 inches. The lead of the involute of any circle may be expressed as a formula, evolved from the above-stated law of the involute, as follows:

Let

L = the lead of the involute
    D = the diameter of the circle
    Pi = 3.1416 inches Then:

L = D multiplied by Pi
    D = $\frac{L}{Pi}$

The leads of the involutes 26 and 26' will, therefore, according to the above, be equal to 4.75 inches. If, now, the involute curve 26 is in contact with a rack tooth the flanks of which are perpendicular to the tangent line 27, and the disk is given one-half a revolution, the rack tooth will move one-half of the lead, or 2.375 inches. If, however, the rack tooth is inclined at an angle of 45° to the tangent line 27 the contact will be along the line a—b, which, by inspection, we see equals 2.375 inches, because a—b equals b—c and b—c is tangent to the disk 25, and since the line b—c is determined by the distance between the involute curves 26 and 26', which represent one-half the lead, and the line a—b, therefore, must equal one-half the lead, or 2.375 inches. One side of the triangle a—b—c has been determined, and we know that the angle a—b—c equals 90°; it follows that the distance represented by the numeral 35, or the measure of the line a—c, must be equal to the square root of the sum of the squares of a—b and b—c which, upon solving, we find equal to 3.3586 inches. Subtracting 2.375 from 3.3586 leaves .9836 inch, which is the distance traversed by the rack tooth in excess of the true distance, and which it is seen is over forty-one per cent. greater than the rack tooth should have traveled. In any rack with inclined teeth as described, meshing with a true involute curve, it can be shown that the forging ahead amounts to the difference in the lead of the involute curves of the base circle and pitch circle selected.

Applying this same demonstration to a hob, the relation of the teeth of which to a gear is, in principle, identical with that of the relation between the teeth of a rack with a gear, it is made evident that the teeth of the hob should have teeth flanks which will not come in contact with the involute curved surfaces of the teeth; and that if these sides should be inclined perpendicular to the pressure angle lines, as is now the custom, and given a lineal movement directly proportioned to the lead of the involute curve of the base circle selected, the resultant curve of the teeth cut thereby could not possibly be in the form of true involute curves to the selected base circle, but would be curves to some other circle smaller in diameter than the circle selected. As a matter of fact, while it is true that involute gears as now manufactured represent a very great advance over the old epicycloidal system of gearing, it is equally true that neither hobbed, planed nor milled gears, will run quietly, and it is further true that such gears will not mesh accurately with one another if the mating pair of gears were not cut by the same method. This is due to the fact that such gears are not made in accordance with the law which I have demonstrated in my application hereinafter referred to to be a universal law governing the generation of all involute curves, and to other causes which have been referred to. It only becomes necessary to observe the scientific principle governing the generation of the curve in its application to all forms of machines or cutters used in manufacturing involute gears to obtain gears which will be absolutely interchangeable irrespective of the fact whether such gears have been cut or generated according to one or the other of the methods of manufacture now employed because the principle is the same in all cases. Hence, gears of a given diametral pitch cut by any one of these methods will necessarily mate with a gear of the same diametral pitch cut by any other method so long as in cutting the teeth the involute curve is produced in accordance with the law which I have heretofore demonstrated to be scientifically correct. Such gears will run quietly, will be characterized by freedom from wear, when the mating gears have an equal number of teeth, and a minimum of wear in all other cases; the involute curve of the teeth will extend from the root circle to the periphery of the tooth, the teeth will be stronger, and there will be an utter absence of interference between the teeth. It is furthermore possible to produce a standard of gearing of known form, which can be laid out by any mechanic or engineer who desires to employ it, and to avoid any necessity for an empirical modification of the tooth curve.

In my application for patent for an involute gear, Ser. No. 97,530, filed May 15th, 1916, I have given the dimensions and measurements of a twelve-tooth gear wheel of 2 diametral pitch corresponding to the gear 3 of the present application. It seems unnecessary, therefore, to go into detail in describing this gear, as the measure of the base circle pitch, which has been given above is the essential factor in determining the lead of the teeth of the hob. For convenience of reference, therefore, I will simply state that the pitch circle radius 5 is equal to 3 inches.

The addendum is equal to $\frac{1}{2}$ of the module or diametral pitch; the radius 6 of the periphery or outside circle of the gear 3 will be equal to $3\frac{7}{16}$ inches; the radius 7 of the base circle is equal to 2.7716; the pressure angle is $22\frac{1}{2}°$; the diameter of the base circle will equal 5.5432 inches; and the perimeter of said base circle will equal 17.4045+ inches. The base circle pitch, which is found by dividing the perimeter of the base circle by the number of teeth (12) in the gear, equals 1.45037 inches. It is to be noted that the measure given above for the base circle pitch will always equal that for any number of teeth so long as the diametral pitch is 2. In a similar way the circular pitch, measured on the pitch circle, is obtained, and is found to equal 1.5708 inches.

Since it is a practice in gearing to have the teeth in gears of the same diametral pitch of equal thickness on the pitch circle, to permit interchangeability, and so that the teeth will have equal strength, said tooth thickness being made equal to $\frac{1}{2}$ of the circular pitch, for the same reasons I have made the teeth of like thickness in the gear 3, shown in the drawings. The thickness of the teeth measured on the root or base circle will, of course, be greater than when measured on the pitch circle, as is obvious from a mere inspection of the drawing.

It now remains to determine the measure of the radius 8 of the curve joining the involute curves of the teeth so that the measure of the radius 10 of the curves of the teeth of the hob may be determined.

In Fig. 1 on the gear 3, which is the base gear, there is the right triangle $e$—$d$—$f$ with the line $d$—$f$ coinciding with the pressure angle line $g$—$g$, and since the pressure angle equals $22\frac{1}{2}$ degrees in the gear shown, the angle $d$—$e$—$f$ will equal $22\frac{1}{2}$ degrees because the line $d$—$e$ is a radial line and perpendicular to the line $g$—$g$ at the point of tangency of said line $g$—$g$ with the base circle 14′. Then the line $f$—$d$ must equal the line $e$—$f$ multiplied by the sine of the angle $d$—$e$—$f$, which measure I find is equal to 1.14804 inches. But the line $d$—$f$ is a tangent line to the base circle intersecting the involute curve of the tooth at the pitch circle 15; therefore, the line $d$—$f$ will be equal to the curved line $d$—$h$ of the base circle 14′, which is in accordance with the law of the involute as heretofore referred to. The curved line $d$—$h$ then will have a measure equal to 1.14804 inches.

Subtracting the measure of the line $d$—$h$ from the base circle pitch (1.45037) leaves as a result .3023 inch as the measure of the arc on the base circle 14′, which is indicated by the radius numeral 8; and this for the reason that the difference between a straight line and the curved one referred to is so small as to be wholly negligible in this connection so that the measure of the arc may be used as that of the radius 8.

As the curves of the teeth of the hob must necessarily have the same measure as the radius 8 it follows that a hobbing cutter for a 2 diametral pitch gear of twelve teeth will have a peripheral tooth radius 10 equal to .3023 inch.

Since a radius represents the distance between a point on a circle and its center, and since it is known that all involute curves generated from the base circle but from different points of origin, are parallel, for the reason that the lead remains the same, it follows, and as shown in Fig. 1, and indicated by the numeral 11, that the semicircular arrangement of the periphery of the teeth 9 of the hobbing cutter 1, will not only generate true involute curves, but also generate the curved root clearance between the teeth, as shown. It is understood that the curve of the teeth 9 of the hob will always be tangent to the involute curve being generated, in accordance with the principle demonstrated in Fig. 4. It will be understood, of course, that the curved periphery of the teeth of the hob extending as they do below the base circle of the gear and beyond the base line 14 of the hob, could not themselves generate involute curves originating on the base circle 14'. In referring, therefore, to the generation of involute curves by these curved cutting surfaces it will be understood that I refer to the cutting away of material beyond the involute curve by said curved surfaces and to a point corresponding to the intersection of said curves with the straight sides of the teeth or with the base line 14, which points, on either side of the teeth, are theoretically the cutting points which must generate the involute curve in accordance with the law governing the generation of the involute curves above referred to.

Figure 3:
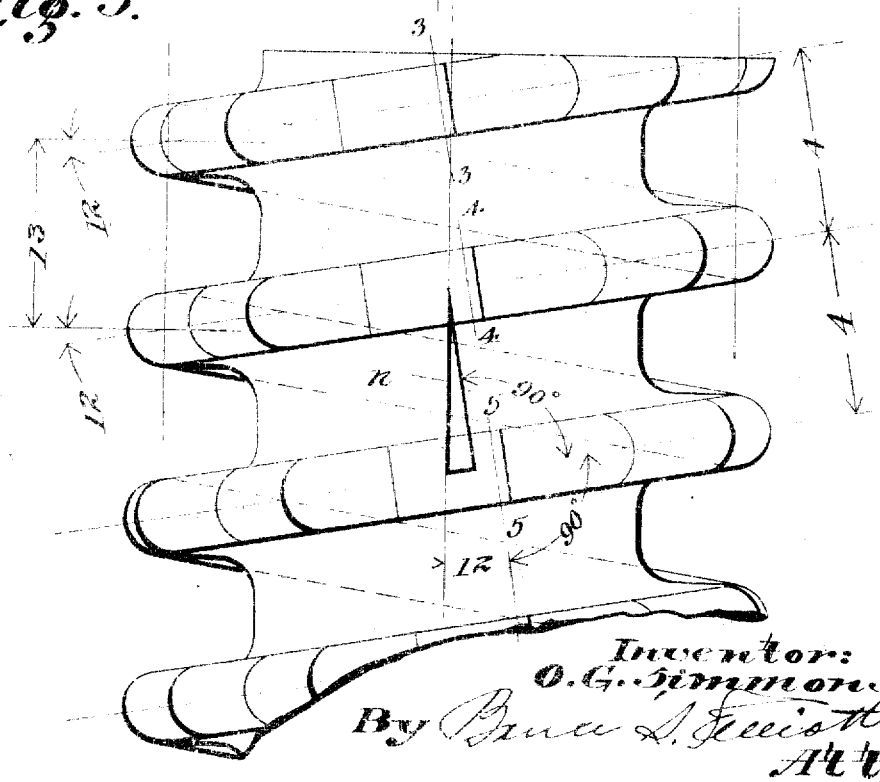
Fig. 3 is a plan view of the same.

It is understood that, as usual in the operation of hobs, my improved hobbing cutter will be set at an angle to the gear to be cut, according to the angle of the helix of the hob, as indicated by the numeral 12 (Fig. 3). The measure indicated by the numeral 4 is usually termed the normal pitch and, as shown, is on the angle of the helix. The actual pitch, or the pitch for which the lathe will be geared to cut the teeth 9, is indicated by the numeral 13. The depth of the teeth 9 of the hobbing cutter 1 indicated by the measures $a$, $b$, and the radius $c$, from the base line 14, Fig. 1, may be anything that will give sufficient clearance between the hob and the teeth 2 of the gear 3.

The thickness of the teeth 9 of the hob will, as previously stated, equal twice the radius 10 of the curved periphery of the teeth.

Figure 2:
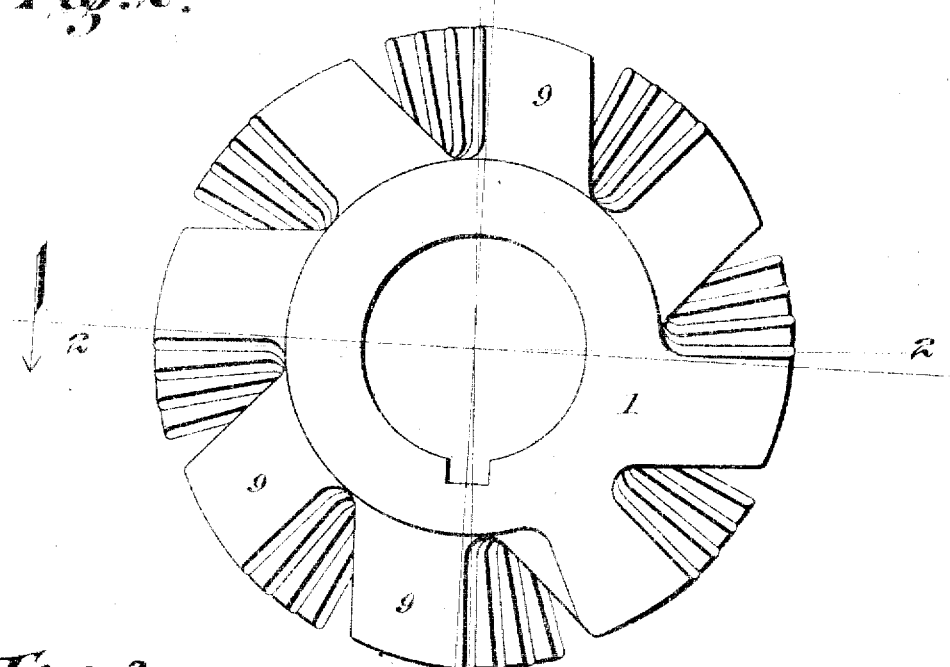
Fig. 2 is a view in end elevation of a hob.

My improved hobbing cutter is fluted at right angles to the angle of the helix of the hob, as shown in Figs. 2 and 3. The angle of the helix may easily be obtained, but since it forms no part of the present invention it will be sufficient to state that this angle is determined by the use of the right angle triangle $n$, Fig. 3.

I claim:

1. A hob for cutting involute gears of a given diametrical pitch having a normal lead substantially equal to the base circle pitch of the gear adapted to be cut.

2. A hob for cutting involute gears provided with straight-sided teeth perpendicular to the axis of the hob.

3. A hob for cutting involute gears having the cutting points of its teeth confined within parallel lines defining the width of the teeth at the base line of the hob.

4. A hob for cutting involute gears having the cutting points of its teeth confined within parallel lines defining the width of the teeth at the base line of the hob and lying wholly on said base line.

5. A hob having teeth either side of said teeth having a single involute-generating point.

6. A hob for cutting involute gears the cutting teeth whereof are provided with curved peripheral cutting points.

7. A hob for cutting involute gears, the cutting teeth whereof are provided with peripheral cutting points having the form of a curve of a circle with a radius corresponding to one-half of the arc between the adjacent involute curves of the gear measured on the base circle of the base gear.

8. A hob for cutting involute gears the teeth whereof from the base line of the hob to the base of the teeth are of any desired depth, the cutting points of said teeth being confined within parallel lines and each tooth having a curved peripheral cutting end, the curve of which connects the sides of the teeth of the hob at the point of intersection therewith of the base line.

9. A hob for cutting involute gears having a normal pitch equal to the base circle pitch of the gear to be cut, and the teeth whereof have their cutting points confined within parallel lines perpendicular to the axis of the hob.

In testimony whereof I have hereunto set my hand.

OLIVER G. SIMMONS.